United States Patent [19]

Vernikov et al.

[11] Patent Number: 4,691,183

[45] Date of Patent: Sep. 1, 1987

[54] DEVICE FOR MAGNETICALLY HOLDING WORKPIECES

[75] Inventors: Arkady Y. Vernikov; Iosif I. Gamarnik; Mikhail P. Rashkovich; Boris A. Trostanovsky; Alexandr S. Khinkus, all of Odessa, U.S.S.R.

[73] Assignee: Odesskoe Spetsialnoe Konstruktorskoe Bjuro Spetsialnykh Stankov, Odessa, U.S.S.R.

[21] Appl. No.: 933,747

[22] PCT Filed: Feb. 13, 1985

[86] PCT No.: PCT/SU85/00012

§ 371 Date: Oct. 7, 1986

§ 102(e) Date: Oct. 7, 1986

[87] PCT Pub. No.: WO86/04850

PCT Pub. Date: Aug. 28, 1986

[51] Int. Cl.[4] .............................................. H01F 7/20
[52] U.S. Cl. .................................... 335/289; 335/294
[58] Field of Search ............... 335/285, 286, 287, 288, 335/289, 290, 291, 292, 294

[56] References Cited

U.S. PATENT DOCUMENTS 1,180,457  4/1916  Walker ................................ 335/289
2,275,839  3/1942  Boehne .......................... 335/286 X
2,435,737  2/1948  Carson ................................ 335/285

OTHER PUBLICATIONS

O. Ya. Konstantinov "Magnitnaya Tekhnologicheskaya Osnastka", 1974, Mashinostroenie, (Leningrad), cf. pp. 159, 160, 218, 221, 222.
O. Ya. Konstantinov "Raschet i Konstruirovanie Magnitnykh i Electromagnitnykh Prisposobleny", 1967, Mashinostroenie (Leningrad), cf. pp. 52, 53.
B. M. Malkin "Magnitnye Prisposoblenia k Metallorezhuschim Stankam", 1965, Mashinostroenie (Moskva, Leningrad), cf. pp. 28, 29.

Primary Examiner—George Harris
Attorney, Agent, or Firm—Fleit, Jacobson, Cohn & Price

[57] ABSTRACT

A device for magnetically holding workpieces to be machined on machine-tools has a magnetic field source (3, 4) and, disposed thereon, a plate (5) whose side adapted to support workpieces (1) has recesses (6) intended to define magnetic poles. The plate (5), in its side facing the magnetic field source (3, 4), has auxiliary grooves (7) shifted with respect to the recesses (6) in such a manner that the distance (b) from the bottom of the recess (6) surface of to the of the plate (5) facing the magnetic field source (3, 4), the distance (a) between the recess (6) and auxiliary groove (7), and the overlap (c) between the recess (6) and auxiliary groove (7) are substantially equal to one another.

1 Claim, 2 Drawing Figures

DEVICE FOR MAGNETICALLY HOLDING WORKPIECES

FIELD OF THE ART

This invention relates to the machine-tool engineering, and, more specifically, to devices for magnetically holding workpieces to be machined on machine-tools.

STATE OF THE ART

Known in the prior art are devices for magnetically holding workpieces, comprising a magnetic field source in the form of coils enclosing steel cores and, disposed thereon, a plate intended to support workpieces (cf. U.S. Pat. No. 2,435,737.

The plate of the above cited device has recesses intended to separate unlike poles. These recesses are filled with a non-magnetic material, e.g. aluminium, and they do not fully perforate the plate to protect the magnetic field source against fouling with cutting fluids used in machining.

With this constructional arrangement of the plate, between the bottom of the recesses and the plate surface facing the magnetic field source, local zones are formed in the plate through which magnetic flux tends to leak, whereby the efficiency of the device is lowered.

DISCLOSURE OF THE INVENTION

The invention is based on the problem of providing such a device for magnetically holding workpieces in which a plate is designed in such a manner as to guarantee a comparatively high efficiency, while preserving sealing of the device.

The above problem is solved by that in a device for magnetically holding workpieces to be machined on machinetools, comprising a magnetic field source, and, disposed thereon, a plate whose surface supporting workpieces has recesses intended to separate magnetic poles, according to the invention, the plate, on its surface facing the magnetic field source, has auxiliary grooves shifted with respect to the recesses in such a manner that the distance from the bottom of the recess to the plate surface facing the magnetic field source, the distance between the recess and the auxiliary groove, and the overlap between the recess and the auxiliary groove are substantially equal to one another.

The device for magnetically holding workpieces to be machined on machine-tools according to this invention, while being comparatively simple in its design, makes it possible to considerably increase attraction forces generated by the device and improve its uniformity, hence consequently, to improve its reliability and safety in operation.

BRIEF DESCRIPTION OF THE DRAWINGS

In what follows, there is a description of a specific embodiment of this invention, with reference to the accompanying drawings, wherein.

PREFERRED EMBODIMENT OF THE INVENTION

Figure 1:
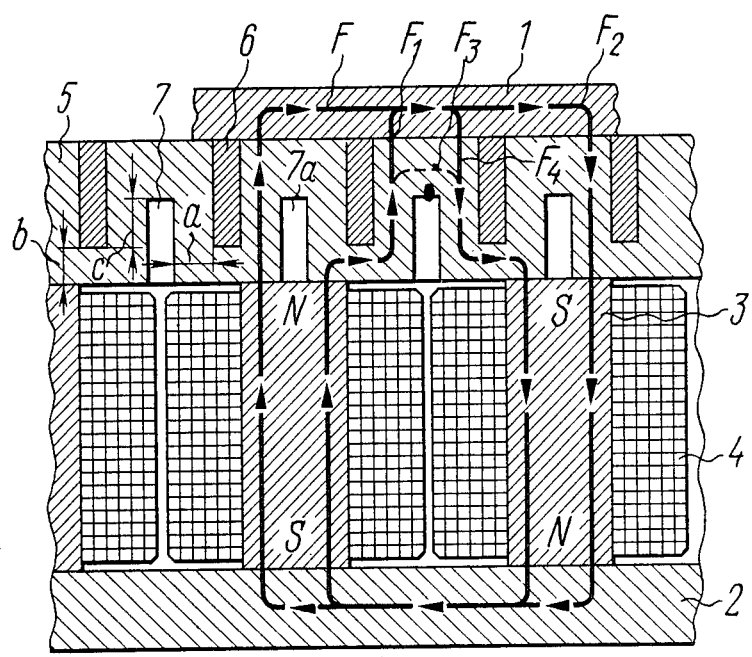
FIG. 1 shows a device for magnetically holding workpieces according to the invention (a cross-sectional view)

Now, referring to FIG. 1, a device for magnetically holding workpieces 1 comprises a base 2 supporting cores 3 with coils 4 forming a source of magnetic field. A plate 5 is mounted over the magnetic field source for supporting the workpieces 1, the place being made of a ferromagnetic material.

The plate 5, on its side adapted to support the workpieces 1, has recesses 6 intended to define magnetic poles in the plate 5. The recesses 6 are filled with a non-magnetic material, such as a non-ferrous metal alloy.

The plate 5, on its side facing the magnetic field source 3, 4, has auxiliary grooves 7 symmetrically disposed above the coils 4, in between, and with an overlap with the recesses 6.

The auxiliary grooves 7 are shifted with respect to the recesses 6 at a distance "a" which is equal to the distance "b" from the bottom of the recess 6 to the plate 5 side facing the magnetic field source 3, 4, and which is also equal to the amount "c" of overlap between the recess 6 and the auxiliary groove recess 7.

Alternatively, the auxiliary grooves 7a may be disposed over the cores 3 as shown in FIG. 1.

The plate 5 may be circular in shape, in which case the recesses 6, auxiliary grooves 7, 7a, cores 3, and coils 4 are made annular in shape and disposed concentrically.

The device for magnetically holding workpieces to be machined on machine-tools functions in the following manner;

The workpieces 1 to be machined are placed on the plate 5, whereupon the coils 4 are energized by a d-c source (not shown). The coils 4 are interconnected in such a manner that, upon being energized, the magnetic polarities of the cores 3 disposed in adjacent coils, on the side facing the plate 5 prove unlike (N, S).

Magnetic flux F generated by the coils 4 penetrates the base 2, plate 5 and the workpiece 1.

The path of the magnetic flux F through the plate 5 depends on the geometric parameters of the plate and dimensions of the workpiece 1. If the workpiece is large enough and covers at least two cores 3, the magnetic flux penetrates it along the path $F_2$ to leave the workpiece 1 along the path $F_2$, the auxiliary grooves 7 forming a barrier preventing the magnetic flux from closing through the plate 5 along the path $F_3$.

If the workpiece 1 is comparatively small and covers one of the cores 3 only, the magnetic flux penetrates it and is closed through the plate 5 along the paths F and $F_4$, or $F_1$ and $F_2$. In that case, the auxiliary grooves 7 will define the passage of magnetic fluxes along the path F and $F_4$ to direct them into the workpiece 1 thus preventing their closure along the path $F_3$.

Figure 2:
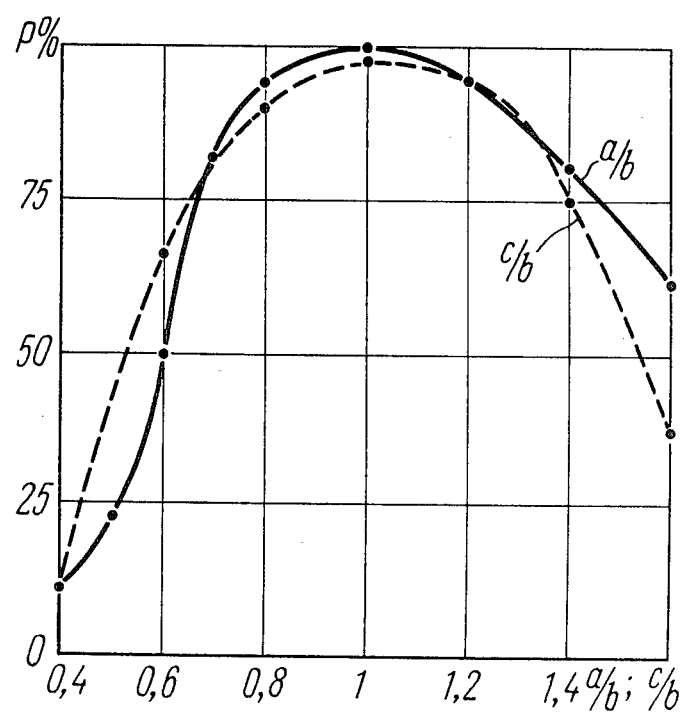
FIG. 2 graphically shows the relationship of the attraction force generated by the device V. geometric parameters of its plate.

It is possible to determine experimentally the effect of geometric parameters of the plate 5 on the attraction force acting upon the workpiece 1. For the sake of convenience, geometric parameters of the plate 5 may be defined in terms of the relationship between its dimensions which determine conditions for the passage of magnetic fluxes $F_1$ and $F_4$. FIG. 2 shows the ration between the distance "a" between the recess 6 and auxiliary groove 7, the overlap "c" between the recess 6 and auxiliary groove 7, and the distance "b" from the recess 6 bottom to the plate 5 side facing the magnetic field source 3, 4 affects the force of attraction P of the workpieces 1. It is clearly seen from FIG. 2 that the device generates the maximum attractive force when the abovementioned distance "a", "b" and "c" are substantially equal, i.e. when the ratios a/b and c/b are equal to 1.

A pilot sample of the device according to the invention for magnetically holding workpieces was made with a round plate 800 mm in diameter and mounted on a plano grinder having a round worktable and a vertical grinding head. Test runs showed that the device according the invention is capable of reliably holding workpicese with a minimum base surface of 40 mm². The specific attraction force (i.e. the force applied per unit of the base surface area of the workpiece) is distributed uniformly enough, its minimum value with the fully loaded device being equal to 35 N/cm².

INDUSTRIAL APPLICABILITY

The device of the invention is recommended for use on grinders, millers, planers and other machine-tools.

The device may be also used as gripping means in handling equipment or robots.

We claim:

1. A device for magnetically holding workpieces to be machined on machine-tools, comprising a magnetic field source (3, 4) and, disposed thereon, a plate (5) whose side supporting workpieces (1) has recesses (6) for defining poles, characterized in that the plate 5, on its side facing the magnetic field source (3, 4), has auxiliary grooves (7) shifted with respect to the recesses (6) in such a manner that the distance (b) from the bottom of the recess (6) to the side of the plate (5) facing the magnetic field source (3, 4), the distance (a) between the recess (6) and auxiliary groove (7), and the overlap (c) between the recess (6) and auxiliary groove (7) are substantially equal to one another.

* * * * *